US009012834B2

(12) United States Patent
Yeh et al.

(10) Patent No.: US 9,012,834 B2
(45) Date of Patent: Apr. 21, 2015

(54) IN-SITU CALIBRATION SYSTEM AND METHOD FOR RADIATION MONITORS

(75) Inventors: Chin-Hsien Yeh, Hsinchu (TW); Ming-Chen Yuan, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 387 days.

(21) Appl. No.: 13/608,180

(22) Filed: Sep. 10, 2012

(65) Prior Publication Data

US 2014/0042309 A1    Feb. 13, 2014

(30) Foreign Application Priority Data

Aug. 7, 2012 (TW) .............................. 101128426 A

(51) Int. Cl.
| | |
|---|---|
| G01D 18/00 | (2006.01) |
| G12B 13/00 | (2006.01) |
| G01T 1/02 | (2006.01) |
| H01J 49/00 | (2006.01) |
| G01T 7/00 | (2006.01) |

(52) U.S. Cl.
CPC ............... *G01T 1/02* (2013.01); *H01J 49/0009* (2013.01); *G01T 7/00* (2013.01); *G01T 7/005* (2013.01)

(58) Field of Classification Search
CPC ..................................................... H01J 49/0009
USPC ......................................................... 250/252.1
See application file for complete search history.

(56) References Cited

U.S. PATENT DOCUMENTS

| | | | | |
|---|---|---|---|---|
| 4,524,279 | A * | 6/1985 | Christianson et al. ...... | 250/497.1 |
| 5,032,719 | A * | 7/1991 | Gleason et al. ............ | 250/252.1 |
| 6,862,087 | B2 * | 3/2005 | Kuroda et al. ............. | 356/141.1 |
| 7,095,030 | B2 * | 8/2006 | Hughes et al. ................ | 250/395 |
| 8,502,134 | B2 * | 8/2013 | Lee et al. .................... | 250/252.1 |
| 2010/0045777 | A1 * | 2/2010 | Mellor ............................ | 348/42 |
| 2012/0112076 | A1 * | 5/2012 | Rosson et al. ............ | 250/361 R |
| 2014/0085481 | A1 * | 3/2014 | Takahashi et al. ............ | 348/162 |

* cited by examiner

*Primary Examiner* — Christine Sung
(74) *Attorney, Agent, or Firm* — WPAT, PC; Justin King

(57) ABSTRACT

By using a scintillation surveymeter with good calibration performance evaluation for a secondary standard radiation field, and a working standard part obtaining an ambient dose equivalent rate, in cooperation with a portable irradiator, and an irradiator lifter, a laser range finder and a laser locator of a relevant radiation source, in-situ calibration is capable of being performed on fixed, or large-scale, or continuous monitoring type radiation monitors to be calibrated stationed in nuclear power plants, nuclear medical departments, and other nuclear facility operating institutions. Moreover, a time-efficient and effective in-situ calibration method is further provided, which can be performed based upon a standard calibration field that is achieved using a portable $^{137}$Cs radiation source. The in-situ calibration method is capable of saving the trouble of delivering large-scale monitors, or monitors difficult to move, or monitors requiring continuous monitoring to calibration laboratories for scheduled calibration.

20 Claims, 5 Drawing Sheets

IN-SITU CALIBRATION SYSTEM AND METHOD FOR RADIATION MONITORS

BACKGROUND OF THE INVENTION

1. Field of Invention

The present invention relates to an in-situ calibration system and method for radiation monitors, and in particular, to a calibration system and method for ambient dose monitors and area monitors provided with an in-situ calibration mode.

2. Related Art

It is well-known that, radiation monitors need to be delivered to qualified laboratories for calibration. However, fixed outdoor type nuclear facility environmental monitors and indoor type nuclear facility control area monitors require continuous monitoring; therefore, when calibration is required, facility operators need to prepare at least one standby instrument to replace an instrument to be delivered for calibration, which virtually increases costs of the facility operators. In addition, monitors are delivered back and forth between workplaces and calibration laboratories, which is time-consuming and increases a risk of accidents. As a result, the aforesaid method results in inconvenience and annoyance to nuclear facility institutions during actual operation.

SUMMARY OF THE INVENTION

An objective of the present invention is to provide a method of directly using a portable $^{137}$Cs standard radiation field to perform in-situ calibration, to save laboratory calibration time and time for delivering monitors to be calibrated back and forth between institutions and laboratories. Another objective of the present invention lies in the result of an in-situ calibration dose rate, whose accuracy conforms to requirements of the American National Standards Institute ANSI-N323A (1997) on radiation protection instrumentation calibration and test specifications. Another objective of the present invention is that facility operators do not need standby area monitors or standby environmental monitors to replace monitors to be calibrated that are delivered to laboratories for calibration, and thus instruments may execute routine radiation protection monitoring tasks without interruption. Another objective of the present invention is that the aforesaid method applies to calibration of various environmental monitors, such as a high-pressure ionization chamber (HPIC) and a multi-Geiger-Mueller tube (Multi-GM tube), and various area monitors, such as an ionization chamber (ion-chamber), a scintillation, and a Geiger-Mueller tube (GM tube). Another objective of the present invention is to overcome the problem of fixed outdoor type environmental monitors and indoor type area monitors installed for various nuclear facilities, because these monitors execute routine, continuous and real-time radiation dose monitoring tasks of environments or workplaces, and are generally not easy or not allowed to be moved away from sites and delivered to laboratories for scheduled calibration; the present invention is capable of providing in-situ calibration to maintain instrument quality and dose measurement accuracy. Another objective of the present invention is to provide an in-situ calibration mode to obtain a calibration result on site, because ambient dose monitors are widely located, so as to be capable of saving time for delivering instruments to and from laboratories, reducing delivery risks, and dispensing with costs of standby environmental monitors. Besides a dose rate calibration accuracy requirement (<20%) that conforms to standards, the present invention uses correction factors of a natural nuclide Ra-226 and an artificial nucleus Cs-137 for correction, so as to be capable of increasing measurement accuracy of an ambient dose equivalent rate H*(10). Another objective of the present invention is that, measurement results of ambient dose monitors are one of the bases for decision making in case of nuclear facility accidents, nuclear explosion fallout pollution precautions and emergency measures for residents to take refuge and evacuate; while area monitors serve as warning equipment when radiation environment conditions are abnormal, and provide one of the dose bases for keeping maintenance staff and workplaces safe and secure. As a result, ambient dose monitors, area monitors, and other dose monitors require scheduled calibration, to maintain accuracy and reliability of dose data.

An embodiment of the present invention provides an in-situ calibration system for radiation monitors, comprising a monitor to be calibrated, where a surveymeter is placed inside, so as to monitor an environmental or area radiation dose; a portable irradiator, having a radiation source inside; a laser locator, close to the portable irradiator during locating, so as to confirm a central location of the surveymeter of the monitor to be calibrated; an irradiator lifter, where an upper end of the irradiator lifter is fixed to a pig of the portable irradiator, so as to set a distance and a height between the portable irradiator and the monitor to be calibrated, so that the radiation source provides the monitor to be calibrated with a radiation dose for detecting the radiation source corresponding to the distance and the height; a laser range finder, used for measuring a distance between the radiation source of the portable irradiator and the monitor to be calibrated; and a portable surveymeter of a site background, used for measuring a radiation quantity of the background during in-situ calibration.

Another embodiment of the present invention provides an in-situ calibration method for radiation monitors, comprising steps of: providing a portable irradiator, a laser locator, a working standard part, an irradiator lifter, a laser range finder, a monitor to be calibrated and a portable surveymeter of a site background; setting performance evaluations of the portable irradiator, comprising the effective range, beam uniformity, and back scattering; setting performance evaluations of the working standard part, comprising the accuracy, stability, response time, energy dependence, and angular dependence; establishing a working standard radiation field of the portable irradiator to be used during in-situ calibration, and generating a table of relative relationships between a distance and an ambient dose equivalent rate H*(10) through calculation; analyzing an uncertainty of an in-situ calibration system, comprising the photon standard radiation dose, beam uniformity, measurement distance and measurement time, with an expansion uncertainty (k=2) of 6%; and verifying the secondary standard radiation field and the working standard radiation field.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention uses a spherical ionization chamber that dates back to an air kerma-rate primary standard to establish a secondary standard radiation field, uses a scintillation surveymeter with good calibration performance evaluations in the secondary standard radiation field, and a working standard part obtaining the ambient dose equivalent rate, in cooperation with a portable irradiator and an irradiator lifter and a laser range finder of a relevant radiation source, and is capable of directly performing in-situ calibration on fixed, or large-scale, or continuous monitoring-type radiation monitors to be calibrated that are stationed in nuclear power plants, nuclear medical departments, and other nuclear facility operating institutions; results of a calibration dose rate indicate that the accuracy conforms to requirements of the American National Standards Institute (American National Standards Institute, ANSI) N323A specifications.

Figure 1:
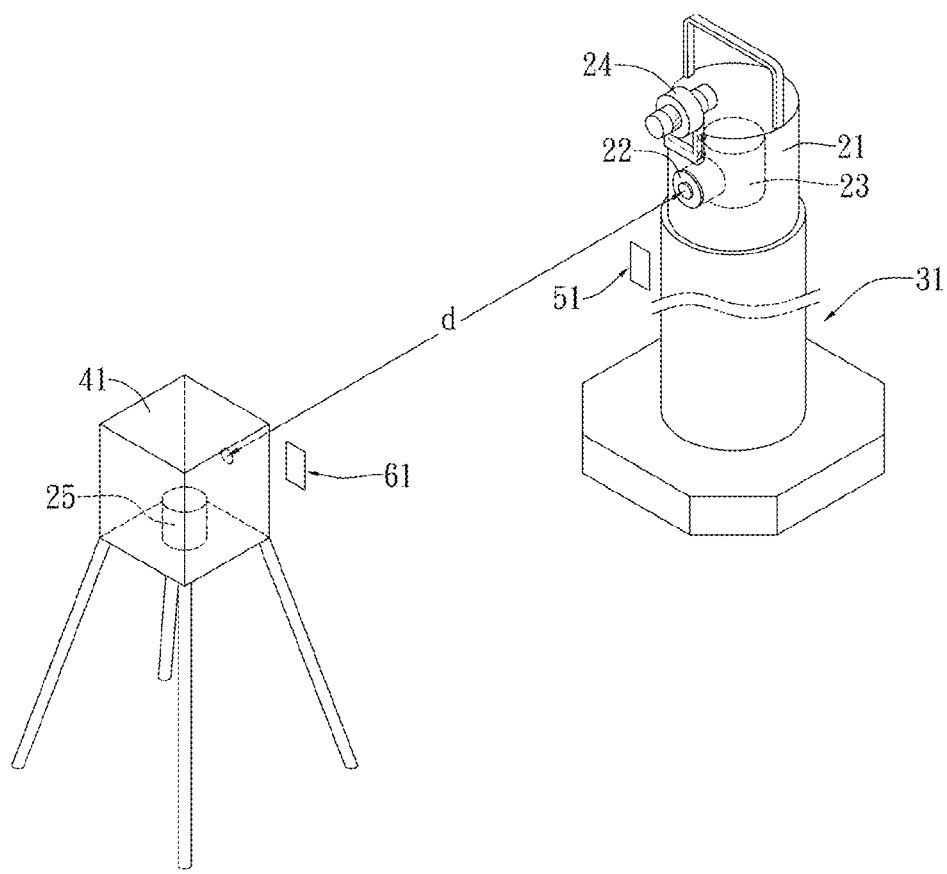
FIG. 1 shows instruments of an in-situ calibration system for radiation monitors.

An embodiment of the present invention, as shown in FIG. 1, provides an in-situ calibration system and method for radiation monitors, where the system provides a set of instruments relevant to the in-situ calibration, including: a portable irradiator 23, a laser locator 24, a working standard part 61, an irradiator lifter 31, a laser range finder 51, a monitor 41 to be calibrated that includes an ambient dose monitor and an area monitor, and a portable surveymeter 25 of a site background, as shown in table 1.

TABLE 1

Instruments relevant to the in-situ calibration

| Instrument | Specification |
| --- | --- |
| Portable irradiator 23 and laser locator 24 | $^{137}$Cs (2.1 GBq); collimator diameter: 6 cm |
| Pig 21 | Diameter: 15 cm; height: 22 cm; weight: 15 kg |
| Working standard part 61 | Scintillation surveymeter (Atomtex-AT1121) |
| Radiation source lifter 31 | Height: 1 m-2 m; an oil hydraulic pump |
| Laser range finder 51 | Distance: 1 cm-10 m (Bosch DLE-50) |
| Environmental monitor | A thermometer or a hygrometer (TES-1364) |
| Portable surveymeter 25 of site background | Portable radiation surveymeter (Automess- AD4) |

Figure 5:
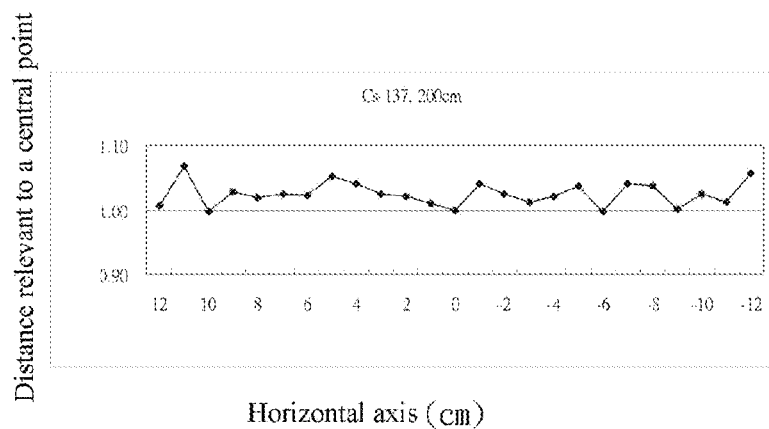
FIG. 5 shows a beam uniform test of a portable irradiator in a horizontal direction.
Figure 6:
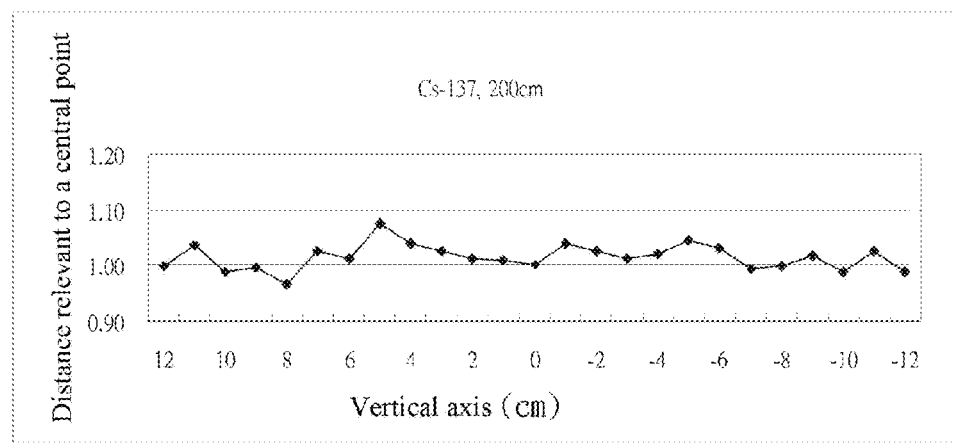
FIG. 6 shows a beam uniform test of a portable irradiator in a vertical direction.

The portable irradiator 23, in this embodiment, as shown in FIG. 1, has a radiation source inside, and the radiation source is cesium 137 ($^{137}$Cs). To avoid leak of the radiation source when there is no operation, the portable irradiator 23 is placed in the pig 21, where the pig 21 has a hole at a front end, and the radiation source of the portable irradiator 23 radiates via the hole; when the portable irradiator 23 is not used, a removable lead plug 22 is used to seal the hole. FIG. 5 shows a beam uniform test of the irradiator in a horizontal direction, where a horizontal axis indicates a horizontal distance, and a vertical axis indicates a distance relevant to a central point. FIG. 6 shows a beam uniform test of the portable irradiator in a vertical direction, where a horizontal axis indicates a vertical distance, and a vertical axis indicates a distance relevant to the central point. The beams are concentrated near the central point.

The monitor 41 to be calibrated, in this embodiment, as shown in FIG. 1, has a portable surveymeter 25 placed inside, so as to monitor an ambient or area radiation dose; and includes an ambient dose monitor, disposed in an open environment, so as to monitor an ambient radiation dose, or an area monitor, disposed in an indoor area, so as to monitor an area radiation dose. The ambient dose monitor is a high-pressure ionization chamber monitor, or a multi-Geiger-Mueller tube monitor. The area monitor is an ionization chamber monitor, a scintillation monitor, or a Geiger-Mueller tube monitor.

An upper end of the irradiator lifter 31, in this embodiment, as shown in FIG. 1, is fixed to the pig 21 in which the portable irradiator 23 is placed, so as to set a distance and a height between the portable irradiator 23 and the monitor 41 to be calibrated, so that the radiation source provides the monitor 41 to be calibrated with a radiation dose for detecting the radiation source corresponding to the distance and the height.

The laser range finder 51, in this embodiment, as shown in FIG. 1, is used for measuring a distance between the radiation source of the portable irradiator 23 and the monitor 41 to be calibrated.

The portable surveymeter 25 of a site background, in this embodiment, is used for measuring a radiation quantity of the background during in-situ calibration; a radiation quantity measured by the monitor 41 to be calibrated, minus the radiation quantity of the background measured by the portable surveymeter 25 of a site background, is a measurement value of a radiation quantity of a real ambient or area dose rate.

This embodiment further includes an environmental monitor, where the environmental monitor is a thermometer or a hygrometer.

The working standard part 61, in this embodiment, as shown in FIG. 1, is a scintillation surveymeter calibrated according to the secondary standard radiation field, so as to detect a radiation dose of the radiation source of the portable irradiator 23 under the conditions of the distance and the height. The secondary standard radiation field is calibrated according to the air kerma-rate primary standard, and the air kerma-rate primary standard is a spherical ionization chamber. As a result, the calibrated working standard part 61 may be regarded as a tertiary standard radiation field, and then the working standard part 61 performs performance evaluations on the portable irradiator 23, as shown in table 2.

TABLE 2

Results of performance evaluations performed by the scintillation surveymeter of the working part

| Item | ANSI N323A Requirement | Working Part |
| --- | --- | --- |
| Stability | 10% | 3% |
| Accuracy | ±15% | 5% |
| Energy dependence | <20% (0.8 MeV-1.2 MeV) | 20% |
| Angular dependence | <20% (0°-45°) | 15% |
| Response time | <5 s (0.1 µSv/h–1 mSv/h) | 4 s |

Figure 3:
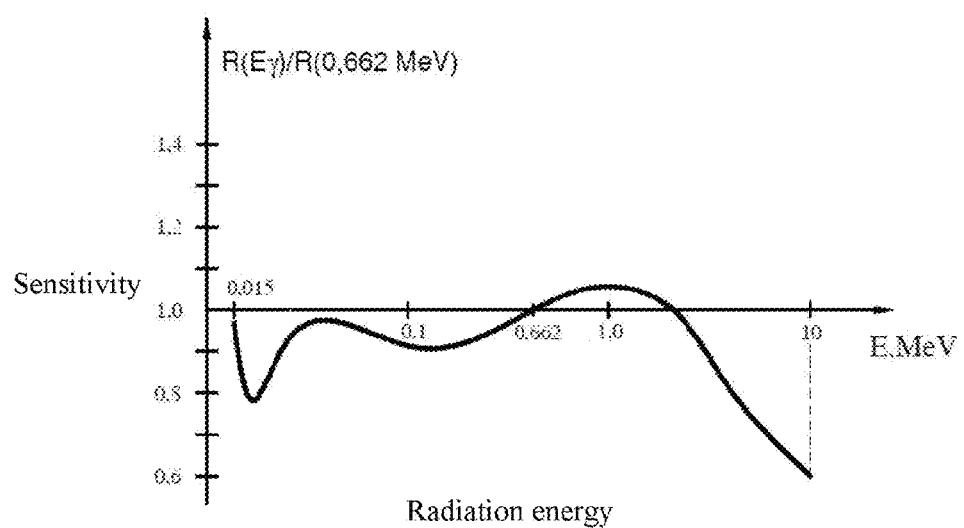
FIG. 3 shows the energy depend of a working standard part.

The working standard part 61, in this embodiment, as shown in FIG. 3, has an energy dependence view, where a horizontal axis indicates radiation energy, and a vertical axis indicates relative sensitivity, which falls into an energy range of environmental radioactivity and nuclear accidents.

Figure 4:
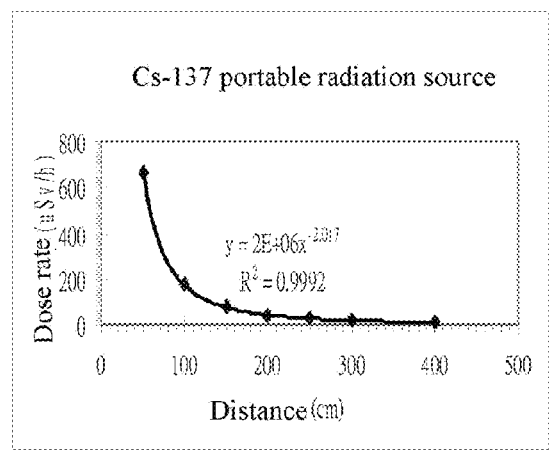
FIG. 4 shows relative relationships between a distance of a working standard part and an ambient dose equivalent rate.

The working standard part 61, in this embodiment, as shown in FIG. 4, has a table of relative relationships between the working standard part 61 and the ambient dose equivalent rate, where a horizontal axis indicates a distance with the unit of centimeter (cm), and a vertical axis indicates a dose rate with the unit of μv/h; the larger the distance is, the lower the ambient dose equivalent rate is.

The portable irradiator 23, in this embodiment, calibrates the ambient dose equivalent rate H*(10) of a laboratory radiation field, as shown in table 3.

TABLE 3

Calibration of the ambient dose equivalent rate H*(10) of a laboratory radiation field

| Dose Rate (μSv/h) | Distance (cm) |
|---|---|
| 90 | 102.3 |
| 80 | 108.4 |
| 70 | 115.9 |
| 60 | 125.1 |
| 50 | 136.9 |
| 40 | 152.9 |
| 30 | 176.4 |
| 20 | 215.6 |
| 10 | 304.1 |
| 9 | 320.4 |
| 8 | 339.7 |
| 7 | 362.9 |
| 6 | 391.8 |

The portable irradiator 23, in this embodiment, performs in-situ calibration on the ambient dose equivalent rate H*(10) of the radiation field, as shown in table 4.

TABLE 4

In-situ calibration of the ambient dose equivalent rate H*(10) of the radiation field

| Dose Rate (μSv/h) | Distance (cm) |
|---|---|
| 554 | 50 |
| 148 | 100 |
| 63 | 150 |
| 37 | 200 |
| 23 | 250 |
| 15 | 300 |
| 8 | 400 |

The working standard part 61 dates back to correction factors of the ambient dose equivalent rate of the secondary standard, as shown in table 5.

TABLE 5

Dating back to correction factors of the ambient dose equivalent rate of the secondary standard

| Ambient Dose Equivalent Rate (μSv/h) | | |
|---|---|---|
| Secondary Standard | Working Standard | Correction Factor |
| 500 | 500 | 1.00 |
| 400 | 400 | 1.00 |
| 300 | 298 | 1.01 |
| 200 | 199 | 1.01 |
| 100 | 100 | 1.00 |
| 50 | 50 | 1.00 |
| 40 | 40 | 1.00 |
| 30 | 30 | 1.00 |
| 20 | 20.2 | 0.99 |
| 10 | 10.3 | 0.97 |
| Average | | 1.00 |

Figure 2:
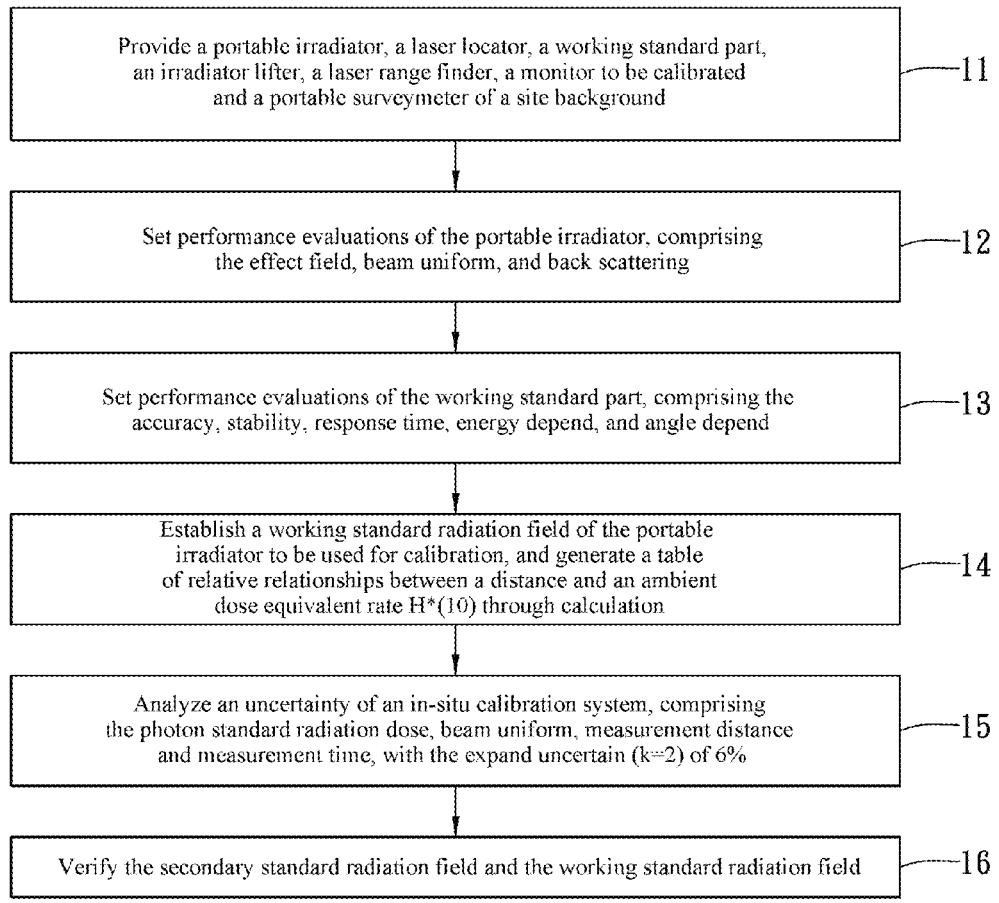
FIG. 2 shows an in-situ calibration method for radiation monitors.

Another embodiment of the present invention, as shown in FIG. 2, provides an in-situ calibration method for radiation monitors, including the following steps: step 11: providing a portable irradiator 23, a laser locator 24, a working standard part 61, an irradiator lifter 31, a laser range finder 51, a monitor 41 to be calibrated and a portable surveymeter 25 of a site background, as shown in FIG. 1 and table 1; step 12: setting performance evaluations of the portable irradiator 23, as shown in table 2, including the effective range, beam uniformity, and back scattering; step 13: setting performance evaluations of the working standard part 61, including the accuracy, stability, response time, energy dependence, and angular dependence; step 14: establishing a working standard radiation field of the portable irradiator 23 to be used for calibration, as shown in table 4, and generating a table of relative relationships between a distance and an ambient dose equivalent rate H*(10) through calculation; step 15: analyzing an uncertainty of an in-situ calibration system, as shown in table 6, including the photon standard radiation dose, beam uniformity, measurement distance and measurement time, with the expansion uncertainty (k=2) of 6%; and step 16: verifying the secondary standard radiation field and the working standard radiation field, as shown in table 5, where the monitor 41 to be calibrated includes an ambient dose monitor, disposed in an open environment, so as to monitor an ambient radiation dose; and an area monitor, disposed in an indoor area, so as to monitor an area radiation dose.

TABLE 6

Uncertainty analysis of the in-situ calibration system

| Analysis Item | Standard Uncertainty (%) | |
|---|---|---|
| | Type A | Type B |
| Photon standard radiation dose | | 1.5 |
| Beam uniformity | 2.3 | |
| Beam stability | 0.35 | |
| Measurement distance | | 0.1 |
| Measurement time | 0.001 | |
| Combination uncertainty | | 2.77 |
| Expansion uncertainty (k = 2) | | 5.54 |

In this embodiment, when the performance of the effective range of the portable irradiator 23 is evaluated, a Geiger-Mueller tube with a diameter of 2 cm is used to measure a range of the effective range in positions that are 15 cm left, right, up and down from a beam center of the portable irradiator 23, obtaining a maximum difference of about 4% from the beam center. When the performance of the beam uniformity of the portable irradiator 23 is evaluated, a high-sensitivity lithium fluoride (LiF) thermoluminescent dosimeter (Harshow/100H) is used on a hollow acryl sheet and in a position that is 4 m away from the radiation source of the portable irradiator 23, to perform measurement at a beam central point of the portable irradiator 23 and in four other positions that are 5 cm up, down, left, and right from the beam central point, thereby obtaining an average difference of smaller than 2.8%, which indicates good beam uniformity in the position that is 4 m away. When the performance of the back scattering of the portable irradiator 23 is evaluated, the portable irradiator 23 is placed in a position on a concrete wall with a height of 1 m and a thickness of 0.1 m on site, so as to obtain from measurement that the largest back scattering influence of the in-situ calibration area monitor is about 10%.

In this embodiment, the working standard part 61 is a scintillation surveymeter, whose test results of performance evaluations, including the accuracy, stability, response time, energy dependence, and angular dependence, conform to requirements of the American National Standards Institute ANSI-N42.17A specifications. The dose rate accuracy is 1 μSv/h to 100 mSv/h with a range difference smaller than 5%.

The stability (standard deviation) of 20 successive measurement values is 3%. The response time is smaller than 1 second. The energy dependence is smaller than 20%. The angular dependence is smaller than 15%.

In this embodiment, as shown in table 7, the verifying the secondary standard radiation field and the working standard radiation field includes comparing laboratory calibration and in-situ calibration dose rate results of a nuclear facility ambient dose monitor (such as an HPIC), with a laboratory calibration correction factor of 0.9-1.0, and an in-situ calibration correction factor of 0.9-1.1.

TABLE 7

Comparison of laboratory calibration and in-situ calibration results of a nuclear facility ambient dose monitor (such as an HPIC)

| Location | Laboratory Standard Value | (mR/h) Instrument Indication Value | Correction Factor | In-Situ Calibration Standard Value | ($\mu$Sv/h) Instrument Indication Value | Correction Factor |
|---|---|---|---|---|---|---|
| Neutron | 0.4 | 0.4215 | 0.9 | 148 | 141.8750 | 1.0 |
| house | 0.8 | 0.8142 | 1.0 | 37 | 35.9700 | 1.0 |
|  | 2 | 1.9652 | 1.0 | 15 | 16.8667 | 0.9 |
| Lungmen | 0.4 | 0.4261 | 0.9 | 148 | 148.6000 | 1.0 |
|  | 0.8 | 0.9400 | 0.9 | 37 | 37.7025 | 1.0 |
|  | 2 | 2.0557 | 1.0 | 15 | 17.0900 | 0.9 |
| 011 house | 0.4 | 0.4246 | 0.9 | 148 | 149.3500 | 1.0 |
|  | 0.8 | 0.8944 | 0.9 | 37 | 38.1500 | 1.0 |
|  | 2 | 2.0310 | 1.0 | 15 | 17.3875 | 0.9 |
| Ashing | 0.4 | 0.4240 | 0.9 | 148 | 140.8000 | 1.1 |
| room | 0.8 | 0.8988 | 0.9 | 37 | 36.2950 | 1.0 |
|  | 2 | 2.0317 | 1.0 | 15 | 16.6450 | 0.9 |

In this embodiment, as shown in table 8, the verifying the secondary standard radiation field and the working standard radiation field includes comparing the laboratory calibration and in-situ calibration dose rate results of an area monitor of an indoor area, with a maximum laboratory calibration difference of smaller than 16%, and a maximum in-situ calibration difference of smaller than 13%.

TABLE 8

In-situ calibration result of an area monitor in a nuclear medical department

| Surveymeter | Brand | Standard Value (38 $\mu$Sv/h) | Difference (%) | Standard Value (148 $\mu$Sv/h) | Difference (%) |
|---|---|---|---|---|---|
| Ionization chamber | H | 34 | −10.5 | 146 | −1.4 |
|  |  | 33 | −13.2 | 139 | −6.1 |
| Ionization chamber | F | 40 | 5.3 | 146 | −1.4 |
|  |  | 38 | 0 | 155 | 4.7 |
| Geiger-Mueller tube | T | 38 | 0 | 141 | −4.7 |
|  |  | 39 | 2.6 | 143 | −3.4 |
| Geiger-Mueller tube | B | 39 | 2.6 | 151 | 2.0 |
|  |  | 30 | 0 | 123 | 1.4 |
| Scintillation | E | 40 | 5.3 | 139 | −6.1 |
|  |  | 40 | 5.3 | 148 | 0 |

In this embodiment, the ambient dose monitor of the monitor 41 to be calibrated is a high-pressure ionization chamber monitor or a multi-Geiger-Mueller tube monitor; the area monitor of the monitor 41 to be calibrated is an ionization chamber monitor, a Geiger-Mueller tube monitor, or a scintillation monitor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-situ calibration system for radiation monitors, comprising:
   a monitor to be calibrated, wherein a portable surveymeter is placed inside, so as to monitor an ambient or area radiation dose;
   a portable irradiator, wherein the portable irradiator has a radiation source inside;
   a laser locator, coupled to a pig, so as to confirm a central location of the portable surveymeter of the monitor to be calibrated;
   an irradiator lifter, wherein an upper end of the irradiator lifter is fixed to the pig, the portable irradiator is placed in the pig, and the irradiator lifter is used for setting a distance and a height between the portable irradiator and the monitor to be calibrated, so that the radiation source provides the monitor to be calibrated with a radiation dose for detecting the radiation source corresponding to the distance and the height; and
   a laser range finder, used for measuring a distance between the radiation source of the portable irradiator and the monitor to be calibrated;
   wherein, said portable surveymeter is of a site background and is used for measuring a radiation quantity of the background during in-situ calibration.

2. The in-situ calibration system for radiation monitors according to claim 1, wherein the portable irradiator is placed in the pig, the pig has a hole at a front end, and the radiation source of the portable irradiator radiates via the hole; when the portable irradiator is not used, a removable lead plug is used to seal the hole.

3. The in-situ calibration system for radiation monitors according to claim 1, wherein a radiation quantity measured by the monitor to be calibrated, minus the radiation quantity of the background measured by the portable surveymeter of the site background, is a measurement value of a radiation quantity of a real ambient or area dose rate.

4. The in-situ calibration system for radiation monitors according to claim 1, wherein the radiation source inside the portable irradiator is cesium 137 ($^{137}$Cs).

5. The in-situ calibration system for radiation monitors according to claim 1, comprising an environmental monitor, wherein the environmental monitor is a thermometer or a hygrometer.

6. The in-situ calibration system for radiation monitors according to claim 1, wherein the monitor to be calibrated is an ambient dose monitor, disposed in an open environment, so as to monitor an ambient radiation dose; or an area monitor, disposed in an indoor area, so as to monitor an area radiation dose.

7. The in-situ calibration system for radiation monitors according to claim 6, wherein the ambient dose monitor is a high-pressure ionization chamber monitor or a multi-Geiger-Mueller tube monitor.

8. The in-situ calibration system for radiation monitors according to claim 6, wherein the area monitor is an ionization chamber monitor, a scintillation monitor, or a Geiger-Mueller tube monitor.

9. The in-situ calibration system for radiation monitors according to claim 1, further comprising:
a working standard part, wherein the working standard part is a scintillation surveymeter calibrated according to a secondary standard radiation field, so as to detect a radiation dose of the radiation source of the portable irradiator under conditions of the distance and the height.

10. The in-situ calibration system for radiation monitors according to claim 9, wherein the secondary standard radiation field is calibrated according to an air kerma-rate primary standard, and the air kerma-rate primary standard is a spherical ionization chamber.

11. An in-situ calibration method for radiation monitors, comprising:
providing a portable irradiator, a laser locator, a working standard part, an irradiator lifter, a laser range finder, a monitor to be calibrated, and a portable surveymeter of a site background;
setting performance evaluations of the portable irradiator, comprising effective range, beam uniformity, and back scattering;
setting performance evaluations of the working standard part, comprising accuracy, stability, response time, energy dependence, and angular dependence;
establishing a working standard radiation field of the portable irradiator to be used during in-situ calibration, and generating a table of relative relationships between a distance and an ambient dose equivalent rate H*(10) through calculation;
analyzing an uncertainty of an in-situ calibration system, comprising photon standard radiation dose, beam uniform, measurement distance and measurement time, with an expansion uncertainty (k=2) of 6%; and
verifying a secondary standard radiation field and the working standard radiation field.

12. The in-situ calibration method for radiation monitors according to claim 11, wherein the monitor to be calibrated comprises an ambient dose monitor, disposed in an open environment, so as to monitor an ambient radiation dose; and an area monitor, disposed in an indoor area, so as to monitor an area radiation dose.

13. The in-situ calibration method for radiation monitors according to claim 12, wherein when performance of the effective range of the portable irradiator is evaluated, a Geiger-Mueller tube with a diameter of 2 cm is used to measure a range of the effective range in positions that are 15 cm left, right, up and down from a beam center of the portable irradiator, obtaining a maximum difference of about 4% from the beam center.

14. The in-situ calibration method for radiation monitors according to claim 12, wherein when performance of the beam uniformity of the portable irradiator is evaluated, a high-sensitivity lithium fluoride (LiF) thermoluminescent dosimeter (Harshow/100H) is used on a hollow acryl sheet and in a position that is 4 m away from a radiation source of the portable irradiator, to perform measurement at a beam central point of the portable irradiator and in four other positions that are 5 cm up, down, left, and right from the beam central point, obtaining an average difference of smaller than 2.8%.

15. The in-situ calibration method for radiation monitors according to claim 12, wherein when performance of the back scattering of the portable irradiator is evaluated, the portable irradiator is placed in a position on a concrete wall with a height of 1 m and a thickness of 0.1 m on site, obtaining from measurement that the largest back scattering influence of the in-situ calibration area monitor is 10%.

16. The in-situ calibration method for radiation monitors according to claim 12, wherein the working standard part is a scintillation surveymeter, whose test results of performance evaluations, comprising the dose rate accuracy is 1 μSv/h to 100 mSv/h with a range difference smaller than 5%; the stability (standard deviation) of 20 successive measurement values is 3%; the response time is smaller than 1 second; the energy dependence is smaller than 20%; the angle angular dependence is smaller than 15%.

17. The in-situ calibration method for radiation monitors according to claim 12, wherein the verifying the secondary standard radiation field and the working standard radiation field comprises comparing laboratory calibration and in-situ calibration dose rate results of a nuclear facility ambient dose monitor with a laboratory calibration correction factor of 0.9-1.0, and an in-situ calibration correction factor of 0.9-1.1.

18. The in-situ calibration method for radiation monitors according to claim 12, wherein the verifying the secondary standard radiation field and the working standard radiation field comprises comparing laboratory calibration and in-situ calibration dose rate results of an area monitor of an indoor area, with a maximum laboratory calibration difference of smaller than 16%, and a maximum in-situ calibration difference of smaller than 13%.

19. The in-situ calibration method for radiation monitors according to claim 12, wherein the ambient dose monitor is a high-pressure ionization chamber monitor or a multi-Geiger-Mueller tube monitor.

20. The in-situ calibration method for radiation monitors according to claim 12, wherein the area monitor is an ionization chamber monitor, a Geiger-Mueller tube monitor, or a scintillation monitor.

* * * * *